United States Patent
Swan et al.

[11] Patent Number: 6,134,310
[45] Date of Patent: *Oct. 17, 2000

[54] TELECOMMUNICATIONS FUNCTIONS MANAGEMENT SYSTEM FOR MANAGING OUTGOING CALLS FROM A PLURALITY OF TELEPHONE TERMINALS

[75] Inventors: Richard Arthur Swan, Dallas, Tex.; John Wallace Marlow, Raleigh, N.C.; Mendel Lazear Peterson, Jr., Richardson, Tex.

[73] Assignee: Nortel Networks Corporation, Montreal, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 08/792,186

[22] Filed: Jan. 30, 1997

Related U.S. Application Data

[60] Provisional application No. 60/011,019, Feb. 1, 1996.

[51] Int. Cl.[7] .................................................. H04M 1/66
[52] U.S. Cl. ........................ 379/188; 379/192; 379/199; 379/200
[58] Field of Search .................................... 379/111, 112, 379/113, 114, 117, 118, 120, 131, 142, 188, 189, 192, 193, 194, 199, 200

[56] References Cited

U.S. PATENT DOCUMENTS

| | | | |
|---|---|---|---|
| 4,578,540 | 3/1986 | Borg et al. | 179/2 |
| 4,825,460 | 4/1989 | Carter et al. | 379/67 |
| 4,926,470 | 5/1990 | Sanford | 379/199 |
| 4,932,042 | 6/1990 | Baral et al. | 379/67 |
| 4,942,598 | 7/1990 | Davis | 379/57 |
| 4,953,202 | 8/1990 | Newell | 379/200 |
| 5,027,391 | 6/1991 | O'Neill et al. | 379/373 |
| 5,062,133 | 10/1991 | Melrose | 379/94 |
| 5,109,408 | 4/1992 | Greenspan et al. | 379/197 |
| 5,127,045 | 6/1992 | Cragun et al. | . |
| 5,200,994 | 4/1993 | Sasano et al. | . |
| 5,200,995 | 4/1993 | Gaukel et al. | 379/200 |
| 5,265,145 | 11/1993 | Lim | 379/88 |
| 5,349,638 | 9/1994 | Pitroda et al. | 379/142 |
| 5,469,497 | 11/1995 | Pierce et al. | 379/188 X |
| 5,471,522 | 11/1995 | Sells et al. | 379/97 |
| 5,535,265 | 7/1996 | Suwandhaputra | 379/199 X |
| 5,623,537 | 4/1997 | Ensor et al. | . |
| 5,655,013 | 8/1997 | Gainsboro | 379/188 |
| 5,802,157 | 9/1998 | Clarke et al. | 379/196 |
| 5,864,613 | 1/1999 | Flood | 379/188 |

*Primary Examiner*—Scott Weaver
*Attorney, Agent, or Firm*—Foley & Lardner

[57] ABSTRACT

The personal communications controller (PCC) may be programmed with a customized service configuration based on which telecommunications functions in connection with multiple telephone terminals are managed. The PCC system is designed to provide enhanced service value to all of the telephone terminals throughout a residence coupled to a single telephone communication line entering the residence. The PCC may provide service differentiation on an individual basis to the telephone terminals and, furthermore, differentiated treatment may be effected on a per telephone call basis. The customized service configuration may be generated using a personal computer from which it is downloaded to the PCC.

6 Claims, 12 Drawing Sheets

FIG. 10

TELECOMMUNICATIONS FUNCTIONS MANAGEMENT SYSTEM FOR MANAGING OUTGOING CALLS FROM A PLURALITY OF TELEPHONE TERMINALS

This application is based on provisional application 60/011,019 filed Feb. 1, 1996.

BACKGROUND OF THE INVENTION

This invention relates generally to telecommunication management systems and, in particular, to a programmable personal communications controller system whereby a user may effectively manage residential telecommunication functions in accordance with a personal service configuration programmed therein. The service configuration defines how the system responds to various attributes associated with either incoming or outgoing calls.

Intelligent telephone terminals have been evolving in terms of features and services supported thereby for management of telecommunications functions. Such intelligent terminals are typically characterized by a microprocessor based telephone set having a liquid crystal display (LCD), which together with the common telephone keypad and a few softkeys provide a user interface whereby the terminal may be programmed and controlled for personal operation. Furthermore, these intelligent telephone terminals are known to be equipped with one or more of the following conventional functionality: a dual tone multi-frequency (DTMF) generator, a DTMF decoder, a digital telephone answering device (DTAD), a time of day (TOD) clock and a calling line identification (CLID) device.

However, the technology capabilities and corresponding service and feature opportunities in existing intelligent telephones have outgrown the capacity of a user to personalize and configure the telephone. The user interface represents a bottleneck to full personalization which point is best illustrated by the following example.

Nortel's 9516 telephone set, a commercially available intelligent telephone terminal having a TOD clock, a two line LCD display and CLID capabilities provides the ability to define a feature key that displays call duration. When you press the key, the LCD display changes from displaying details about the call, either caller identification for terminating call or calling information for originating calls, to displaying call duration time. Press the key again and the display returns to call details.

Other intelligent telephone sets are known to provide a similar call timer that is continuously displayed on their LCD display. A call timer function can be assigned to one of the programmable keys provided on the set. It's function is to reset the timer to zero.

Still other vendors have telephone sets with a call duration timer on their LCD display. Programming of the telephone set simply enables or disables the call timer on a permanent basis.

These represent at least three different variations on implementation of the call timer feature. Telephone set manufacturers generally pick a specific implementation and then provide a programming function whereby a user may only enable or disable this feature.

It would not be difficult to implement the several variations within the telephone set firmware. The difficulty is in providing a configuration setup interface using the LCD display and keypad of the intelligent terminal that empowers the user to configure the call timer feature to his particular personalization.

Speed calling directories is another example where the inadequacy of the telephone display/keypad user interface. Many intelligent telephones now have an internal directory of name and telephone number lists. Typically, these telephones do not include an alphanumeric keyboard so that names are entered from the digit keypad. For instance, the "2" key is for entering the letters "ABC"; press once for "A", press twice for "B", a third press for "C".

Furthermore, any telecommunication management functions provided by the intelligent telephone terminal are limited to itself and thus it is not particularly useful in a residence having a multiple telephone extension wiring configuration connected to which it is common to find several telephone sets. Still further, there is no way to add incremental service functionality to existing telephone terminals without either replacing the terminal or at a minimum effecting some kind of hardware modification, upgrade.

It is, therefore, desirable to have adjunct system that provides flexibility for a user to truly personalize its configuration and whereby enhanced telecommunications services and features are supported for multiple telephone terminals within the user's residence.

SUMMARY OF THE INVENTION

It is an object of the present invention to provide a new and improved method and system for managing telecommunication functions.

The invention, therefore, according to a first broad aspect provides in a telecommunications functions management system for a telecommunications service subscriber having a plurality of telephone terminals communicatively coupled to a telecommunications network, a method for managing outgoing calls originating from any of the plurality of telephone terminals, comprising the steps of: providing one or more predetermined block call identifiers; associating each predetermined block call identifier with one or more telephone terminals of the plurality of telephone terminals; correlating a directory number of one outgoing call to a particular block call identifier of the one or more predetermined block call identifiers; identifying one terminal of the plurality of telephone terminals at which the one outgoing call is being originated; and blocking, responsive to the one terminal being associated with the particular block call identifier, the one outgoing call.

In accordance with a second broad aspect, the invention provides for a telecommunications service subscriber having a plurality of telephone terminals communicatively coupled to a telecommunications network, a system for managing outgoing calls originating from any of the plurality of telephone terminals, comprising: means for providing one or more predetermined block call identifiers; means for associating each predetermined block call identifier with one or more telephone terminals of the plurality of telephone terminals; means for correlating a directory number of one outgoing call to a particular block call identifier of the one or more predetermined block call identifiers; means for identifying one terminal of the plurality of telephone terminals at which the one outgoing call is being originated; and means for blocking, responsive to the one terminal being associated with the particular block call identifier, the one outgoing call.

A personal communications controller (PCC), embodying the present invention, may be programmed with a personal service configuration based on which telecommunications functions in connection with multiple telephone terminals are managed. The PCC system is designed to provide enhanced service value to all of the telephone terminals throughout a residence coupled to a single telephone communication line entering the residence. The PCC may provide service differentiation on an individual basis to the telephone terminals and, furthermore, differentiated treatment may be effected on a per telephone call basis.

A wireline arrangement of the personal communications controller system effects a signaling protocol between the PCC and the telephone sets over the single twisted pair telephony wiring existing within the residence. The signaling is shared with normal analog telephone line operation by utilizing a frequency band which is above the telephony band. It is fully compatible with existing conventional analog telephone signaling and voice. The signaling operates transparently and invisibly to the telephone central office. The PCC includes suitable protection equipment to prevent leakage of its signaling outside the home into the telephone company wiring.

A wireless arrangement of the present system comprises the PCC integrated into a base station which is able to communicate and control multiple cordless handsets over radio frequency channels.

A personal computer (PC) or any other data processing workstation may be utilized to generate the service configuration which is then downloaded therefrom to the PCC. In operation, however, the PCC represents a standalone "computer peripheral" that operates independently and externally to the PC for call processing. The PC brings advantageous value to the PCC system. The role of the PC is to unblock the personalization bottleneck. An intuitive graphical interface on the PC enables a much broader flexibility of configuration and the standard PC keyboard is a more efficient input means for generating the service configuration, for instance, to do data entry.

The service configuration defines parameter in accordance with which the PCC operates. For instance, the PCC may have installed a number of predefined features and services for which the personal service configuration may include parameters that indicate to either activate or deactivate specific ones as desired. For frequently used features, this approach is beneficial. Other operational parameters include associating a distinctive alert cadence with a particular calling number and, further, a particular mailbox to leave a message if the call is not answered.

BRIEF DESCRIPTION OF THE DRAWINGS

The invention will be better understood from the following description of a personal communications controller system together with reference to the accompanying drawings, in which.

DETAILED DESCRIPTION

Figure 1:
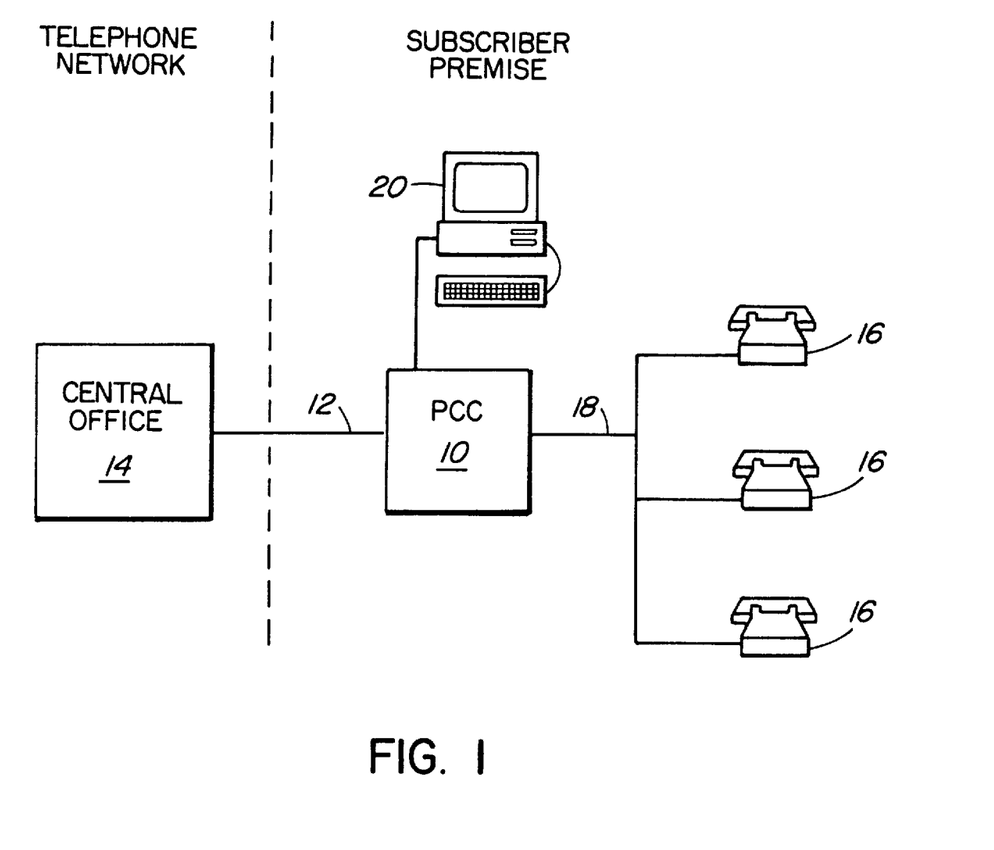
FIG. 1 is a block diagram that generally represents the personal communications controller system.

Referring to FIG. 1, depicted for illustrating the personal communications controller system, in accordance with the present invention, is a personal communications controller (PCC) 10 which may be connected through a conventional communication line 12 to a central office 14 of a telephone network and to which a plurality of telephone terminals 16 may be communicatively coupled, through either wireline or wireless connectability represented by line 18. The communication line 12 may be a typical analog subscriber loop having tip and ring leads, an integrated service digital network line or other conventional interfaces for network access. The communicative coupling 18 may be effected by a parallel connection between the PCC 10 and all telephone terminals 16, individual connections for respective terminal 16 to the PCC 10 and, alternatively, employing a combination of parallel and independent connections. Also connectable to the PCC 10 is a personal computer workstation or PC 20.

The personal communications controller system and specifically the PCC 10 constitutes subscriber premise equipment that is logically positioned intermediate and operationally interconnects the telephone network wiring, namely line 12, entering a subscriber's residence and the telephone terminals 16 dispersed throughout the residence. It, however, should be understood that the PCC 10 is not necessarily limited to serially connecting, in physical terms, the communication line 12 to the terminals 16. This logical positioning enables the PCC 10 to act as a telecommunication hub which intercepts, blocks and processes signaling and voice between the line 12 and telephone terminals 16 to thereby effectively manage residential telecommunications functions. Examples of services and features supported for management functions in connection with incoming calls include determining which calls to answer, when to answer and where to send answered calls. Similar options and controls are supported for outgoing calls. The PCC 10 may provide differentiated call treatment, such as alerting and originating features, on a per telephone terminal basis and on a per telephone call basis, to the multiple telephone terminals 16 connected to the telephone network via the single line 12.

Figure 2A:
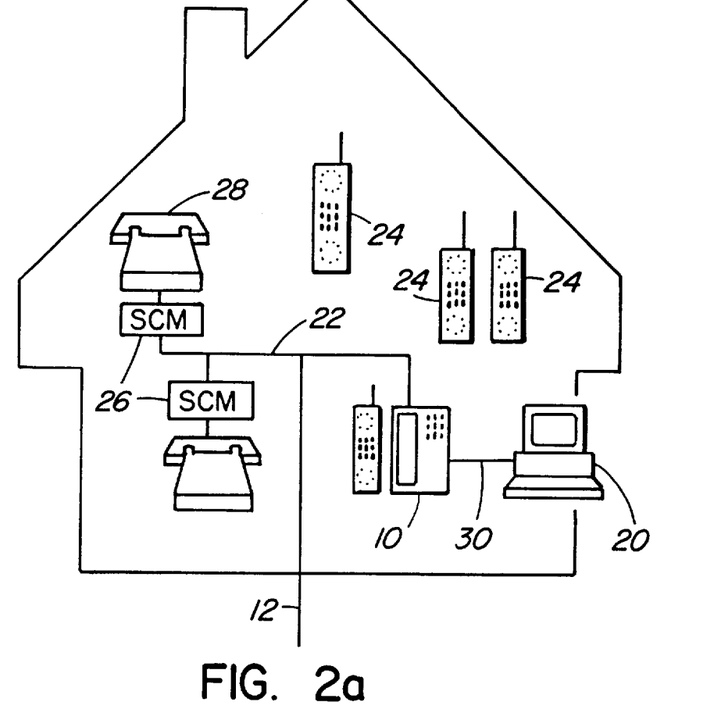
FIGS. 2a and 2b illustrate various configurations of the personal communications controller system at a subscriber's residence.

Various configurations for installation of the PCC 10 at the subscriber's residence are possible. FIG. 2a exemplifies both wireline and wireless based installations, wherein the PCC 10 is integrated into a cordless telephone base station which is connected to an extension of the single line inhouse telephony wiring 22 which provides multiple telephone extensions in parallel. The base station has the capability to establish radio wave links over which it may control and communicate with multiple remote cordless handset 24. Satellite communicator modules (SCMs) 26 are connected to other telephone extensions, and one or more conventional analog telephone sets 28 may be connected to each SCM 26. The inhouse wiring 22 is the medium over which a bi-directional signaling path between the PCC 10 and the SCMs 26 may be established. In addition to providing telecommunications management functions on a per telephone call basis, each handset 28 and SCM 26 may be addressed individually by the PCC 10 whereby enhanced services may be provisioned on a per telephone terminal basis, in accordance with a programmed service configuration for the particular handset 28 or telephone set 24 corresponding to the particular SCM 26.

The SCM 26 enables the provision of enhanced services on an individual basis to the telephone sets 28 which otherwise are connected in parallel by the inhouse wiring 22 at extensions that are remotely located in the residence distant from the PCC 10. The SCM 26 is able to intercept and even block signals between the telephone line 12 and its locally connected set 28. For example, the PCC 10 could determine that an incoming call is intended for a particular person and then would signal only the appropriate SCMs 26 to provide ringing indication; there would be no ringing indications at telephone sets attached to other SCMs. The SCMs 26 could either block, enable or even generate ringing signals for their locally connected telephone sets 28. Preferably, the ringing notification of the sets 28 connected to the SCMs 26 would be disabled and an internal SCM ringing generator or any other means for alerting of an incoming call could be used. It is envisioned that the SCM functionality may be integrated into the telephone sets 28 instead of employing two separate devices.

Figure 2B:
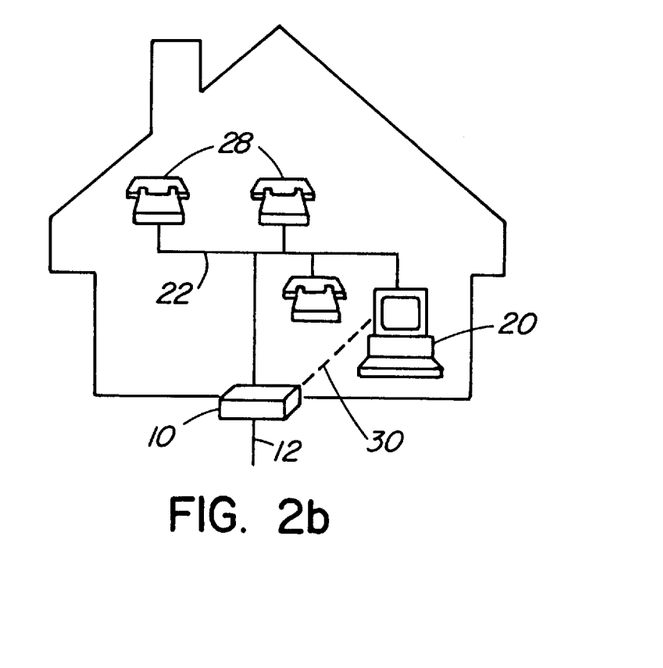

Another configuration of the personal communications controller system, shown in FIG. 2b, is a wireline based installation having the PCC 10 disposed as an entrance unit between the communications line 12 entering the residence and all the telephone extensions of the inhouse telephony wiring 22. In this particular arrangement, the PCC 10 connects to and controls in parallel conventional telephone sets 28 attached to the various telephone extensions, and supports enhanced telephony services on a per telephone call basis as the telephone sets 28 may not be individually controlled. Alternatively, each telephone extension may be provisioned with an SCM 26 whereby the sets 28 connected thereto may then be independently controlled, and cordless handsets may also be utilized.

It should be understood that the handsets 24 and the telephone sets 28 are merely exemplary of the types of telephone terminals 16, referred to above in connection with FIG. 1, that may utilized in conjunction with the PCC 10. The telephone terminals 16 are representative of conventional telephony equipment by which a person interfaces with the telephone network and, in particular, associated with each telephone terminal 16 is an incoming call alerter (e.g., ringing indicator) which is controllable by the PCC 10.

The PC 20, advantageously forming part of the personal communications controller system, is connectable to the PCC 10 and functions to provide service configuration and programming for the PCC 10. A graphical user interface facilitates use of the PC 20 for generating a service configuration which is then downloaded to the PCC 10. The PC 20 is not involved in the real time processing of telephone calls and therefore may be disconnected from the PCC 10 once it has been programmed. Communication between the PCC 10 and the PC 20, as illustrated in FIGS. 2a and 2b, may be effected through a dedicated link 30 such as an RS-232 bus attached to the serial port of the PC 20 or, alternatively, over the inhouse telephony wiring 22 by utilizing a modem for this purpose.

Figure 3A:
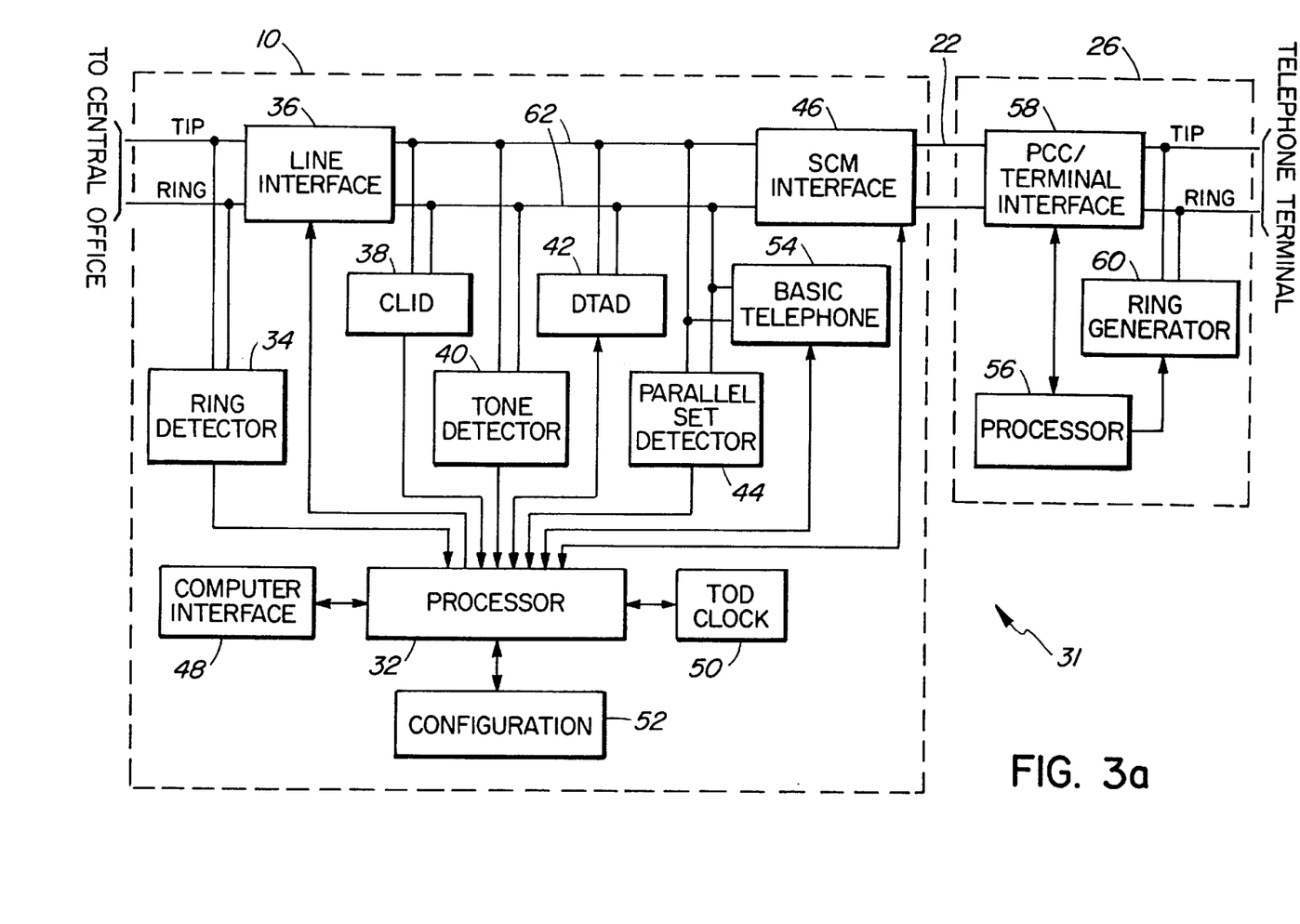
FIG. 3a is a block diagram illustrating internal details of a personal communications controller and satellite control module for a wireline implementation of the system.

Turning now to FIG. 3a, depicted are the functional modules within the PCC 10 and the SCM 26, which combination corresponds to the wireline implementation of the personal communications controller system of FIG. 2a and is generally referenced by 31. The PCC 10 comprises a processor 32 which interacts with a ring detector 34, line interface 36, calling line identifier (CLID) 38, tone detector 40, digital telephone answering device (DTAD) 42, parallel set detector 44, SCM interface 46, computer interface 48, time of day (TOD) clock 50, service configuration 52 and a basic telephone unit 54. The SCM 26 includes a processor 56 which interacts with a PCC/terminal interface 58 and a ring generator 60 as an alerter which is operable at multiple cadences.

The line interface 36 serves to couple the PCC 10 to the tip and ring leads of the communication line 12 of the central office, and is serially connected across internal tip and ring leads 62 to the SCM interface 46. The line interface 36 includes a call termination impedance together with an on-hook/off-hook switching function controlled by the processor 32 in order to answer incoming calls. It also includes suitable line protection circuitry to prevent leakage of the PCC signaling into the telephone network wiring. The SCM interface 46 is adapted to couple the PCC 10 to the single line telephony wiring 22 to which multiple SCMs 26, via their PCC/terminal interface 58, are connected in parallel at various extensions within a subscriber's residence. The SCM interface 46 and PCC interface 58 communicate through a bi-directional signaling protocol whereby the PCC 10 is able to individually address remote SCMs 26 using telephone company regulatory compliant techniques on the single line twisted pair wiring 22. A signaling channel is effected on the line 22 outside the regular voice channel, and thus signaling is shared with normal analog telephone line operation. It is fully compatible with existing conventional analog telephone signaling and voice. The signaling operates transparently and invisibly to the telephone network central office.

It should be understood that the inhouse wiring 22 and the communications line 12 may be the same subscriber loop which is connected to the central office of the telephone network and therefore, as shown in FIG. 2a, the PCC 10 can be connected in parallel with the other extension telephone sets 28 within the subscriber's residence. Alternatively, as shown in FIG. 2b, the PCC 10 may provide a circuit connection between line 12 from the central office and the inhouse telephony wiring 22.

Turning back to FIG. 3a, the PCC/terminal interface 58 of the SCM 26 is also adapted for coupling the SCM to a telephone terminal and includes a switching function operated by its processors 56 in order to connect or disconnect the terminal from wiring 22. The ring generator 60 is controlled by the processor 56 in accordance with control commands received from the PCC 10, to produce distinctive ringing associated with the telephone terminal.

Within the PCC 10, the ring detector 34 is connected across the tip and ring leads of the communication line 12 for detecting incoming ring signals from the central office and reporting same to the processor 32 which may then take action in any of a number of ways, in accordance with the service configuration 52. The CLID 38 provides, in a CLASS environment, reception and display of calling details as well as storage of details from previous incoming calls, up to a certain limit. The integrated DTAD 42 functions include voice storage and synthesis for greetings and prompts, DTMF digit recognition, multiple voice message mailboxes and speed calling directories. The tone detector 40 detects various tones including dial tone, ringback tone, busy tone and the like, the reception of each being identified to the processor 32. The parallel set detector 44 functions to recognize whether or not telephone terminals at other extensions are off-hook (i.e., in use) and provides a output signal indicative of such to the processor 32. The computer interface 48 may be a serial port and/or integrated modem for communication with the PC 20. The TOD clock 50 is utilized by the processor 32 in implementing any time related services and features of the personal communications controller system.

The basic telephone unit 54 consists of conventional telephone set equipment, such as, a DTMF keypad and user configurable "feature" keys for functions like dialing frequently called numbers, a handset, a LCD display and an optional handsfree unit. The telephone unit 54 enables the PCC 10 be utilized as an addition extension telephone set.

The service configuration 52 constitutes configuration data which is downloaded via the computer interface 48 from the PC 20 and which controls operation of the processor 32. The configuration 52 defines operational parameters for the PCC 10 and includes address information in respect of each SCM 26 with which the PCC 10 communicates, directory information, feature activation and deactivation indications as well as further operational data used by active features, if appropriate.

Figure 3B:
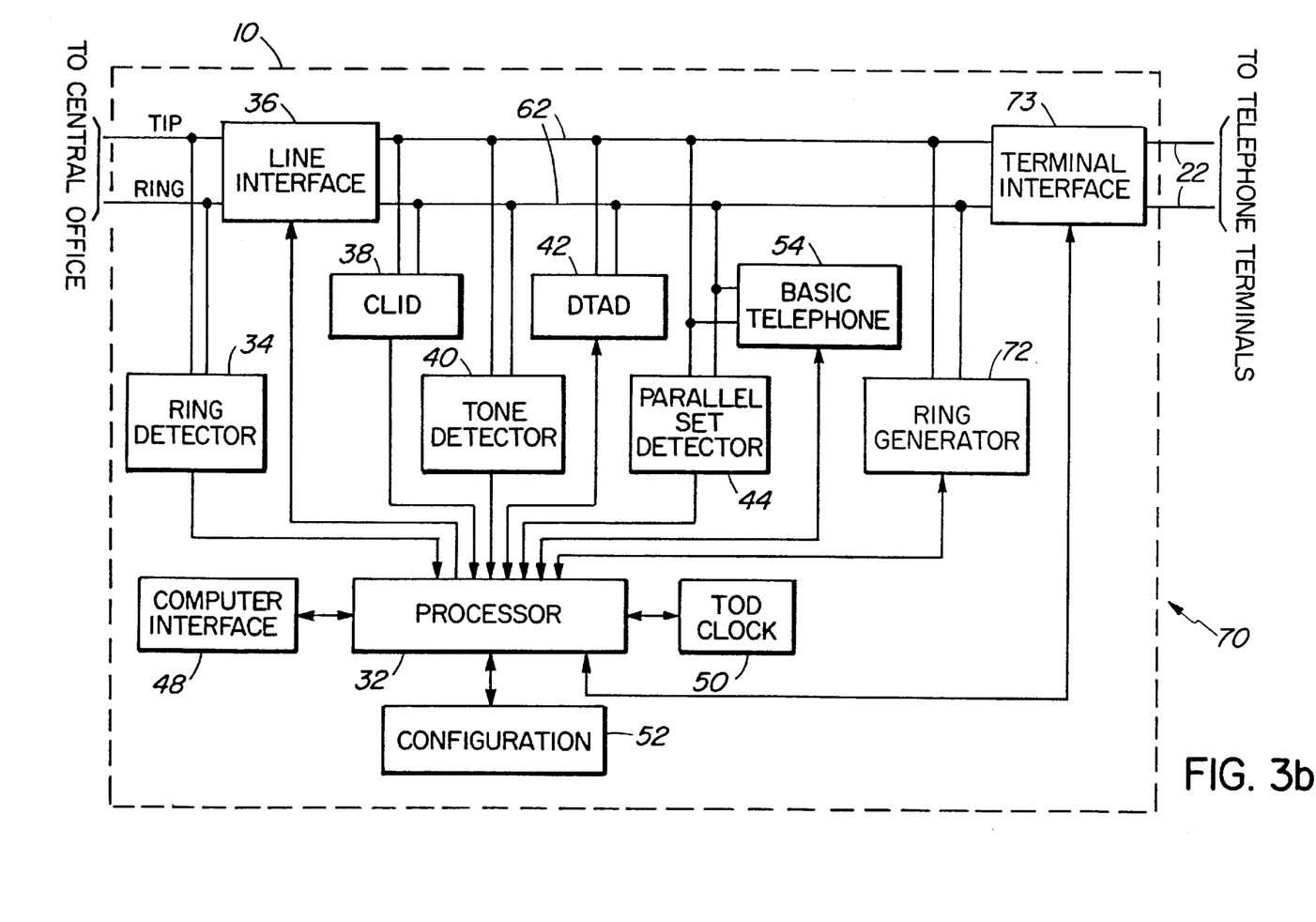
FIG. 3b is a block diagram illustrating internal details of the personal communications controller for a second wireline implementation of the system.
Figure 3C:
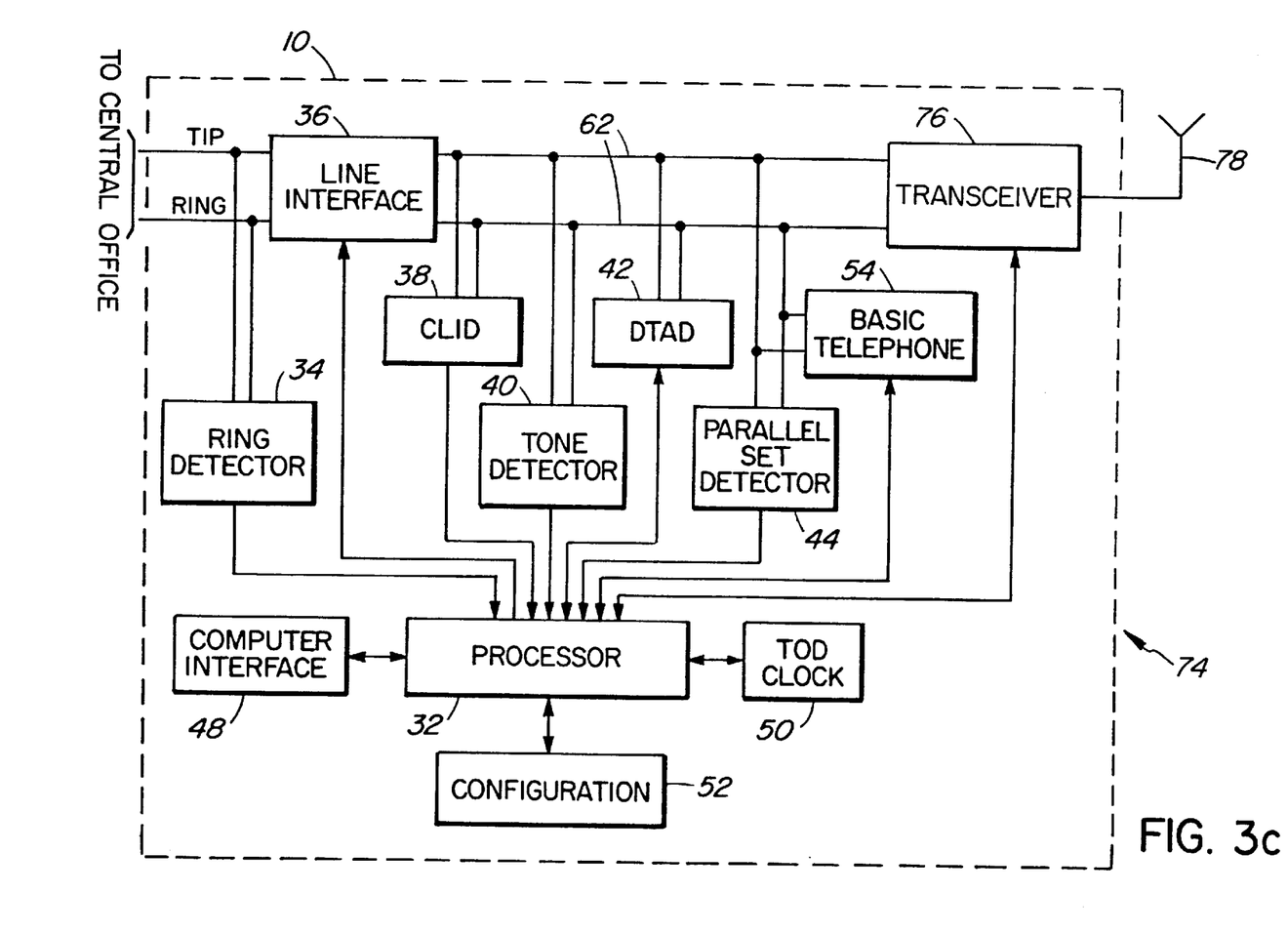
FIG. 3c is a block diagram illustrating internal details of the personal communications controller for a wireless implementation of the system.

FIG. 3b depicts a second embodiment 70 of the functional structure of the PCC 10 for the wireline implementation corresponding to FIG. 2b. This second embodiment 70 is substantially similar to the first embodiment 31 of the PCC system in FIG. 3a, except the PCC 10 in FIG. 3b now includes a ring generator 72 and a terminal interface 73 to which the multiple telephone terminals are connected in parallel over the inhouse wiring 22. FIG. 3c depicts a wireless based embodiment 74 of the PCC 10 that includes a transceiver radio 76 and antenna 78 in combination, by which the PCC 10 interacts with and controls an otherwise convention cordless handset 24 as shown in FIG. 2a, for example, to ring when an appropriate incoming call is received by the PCC.

The following describes exemplary services and features supported by the personal communications controller system, as illustrated in FIG. 1. These services span three functional areas: incoming call termination and signaling, call origination, and call integrity.

CALL TERMINATION AND SIGNALING

Under the call termination and signaling functional area, services and features include an automatic attendant, selective and distinctive ringing, toll alert, a do not disturb (DND) feature, time of day (TOD) blocking, priority override, call detail recording, and single number service.

Automatic Attendant

Figure 4:
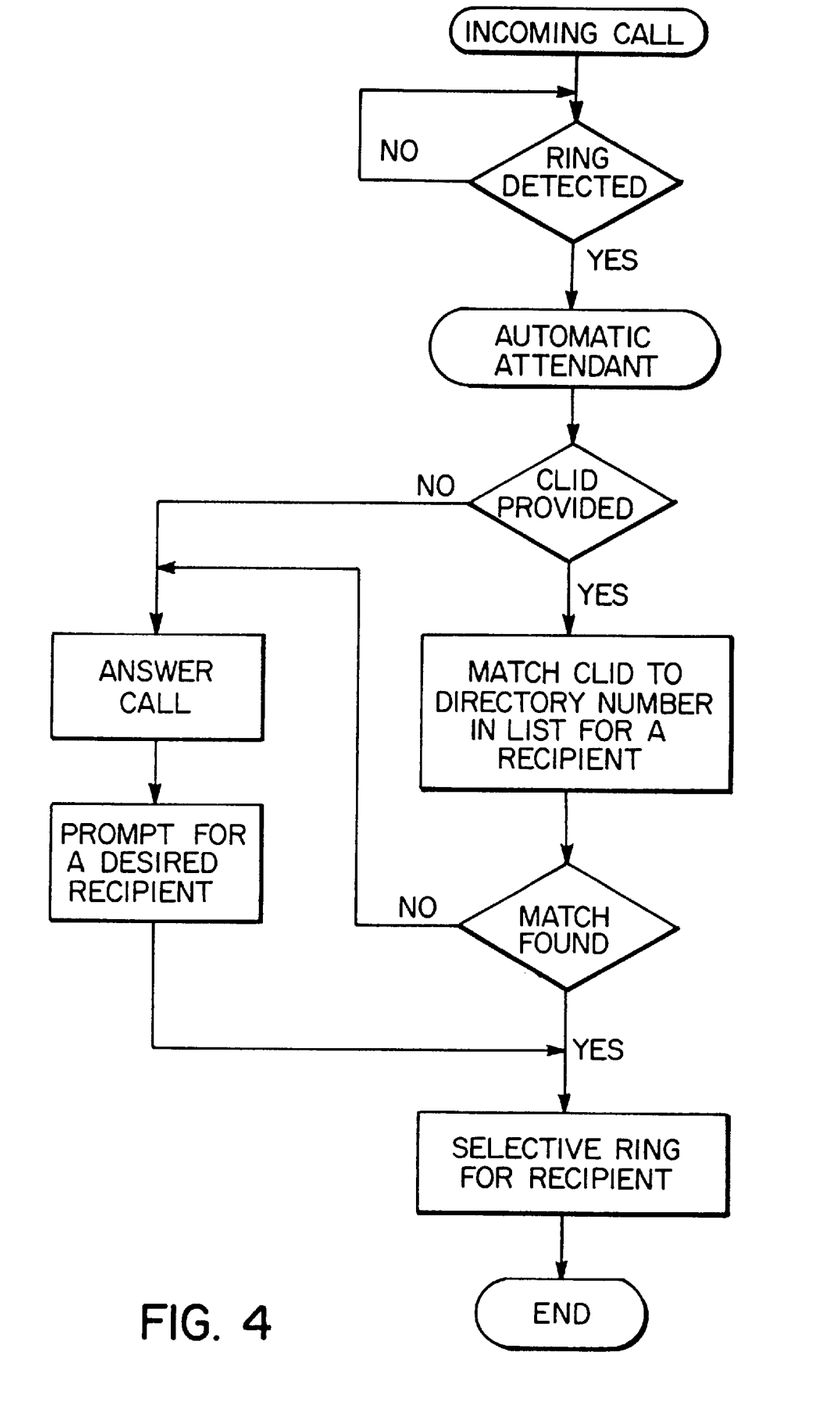
FIG. 4 is a flow chart depicting operation of the personal communications controller to effect an automatic attendant functionality.

FIG. 4 exemplifies a process for effecting by the PCC 10 the automatic attendant function. When the PCC 10 detects a ringing signal on the line 12, responsive thereto the PCC 10 functions as an automatic attendant to determine a recipient for whom an incoming call is destined and then properly alert the intended recipient. It is noted that a recipient may be an individual, such as, each member of a household or a group of individuals, such as, the adults and the kids within the household. There are two techniques that may be used for destination determination:

1) If the calling number (CLID) is provided by the central office 14 of the telephone network, the PCC 10 will utilized the CLID information and look for a match within one or more internal lists of directory numbers which form part of the configuration data. For instance, each recipient (e.g., adults and kids or individuals within the household) may have a respective directory list containing directory numbers corresponding to persons from whom calls are frequently received. Each directory list also contains information about the type of alerting for the particular recipient attached to that list.

2) If the CLID information is not provided by the central office or a match is not found in the directory lists within the configuration data, then the PCC 10 will automatically answer the call and present a routing or call treatment options menu to the caller. For example, the PCC 10 may voice prompt for a touch tone digit—"For adults press 1, for kids press 2"—and based on the received DTMF digit, the appropriate recipient for routing of the call is determined. For each routing option, there is a specified within the configuration data the type of alerting.

Once the automatic attendant has determined the destination of the call, it will properly alert the household members as described in the selective ringing feature below.

Selective Ringing

Figure 5:
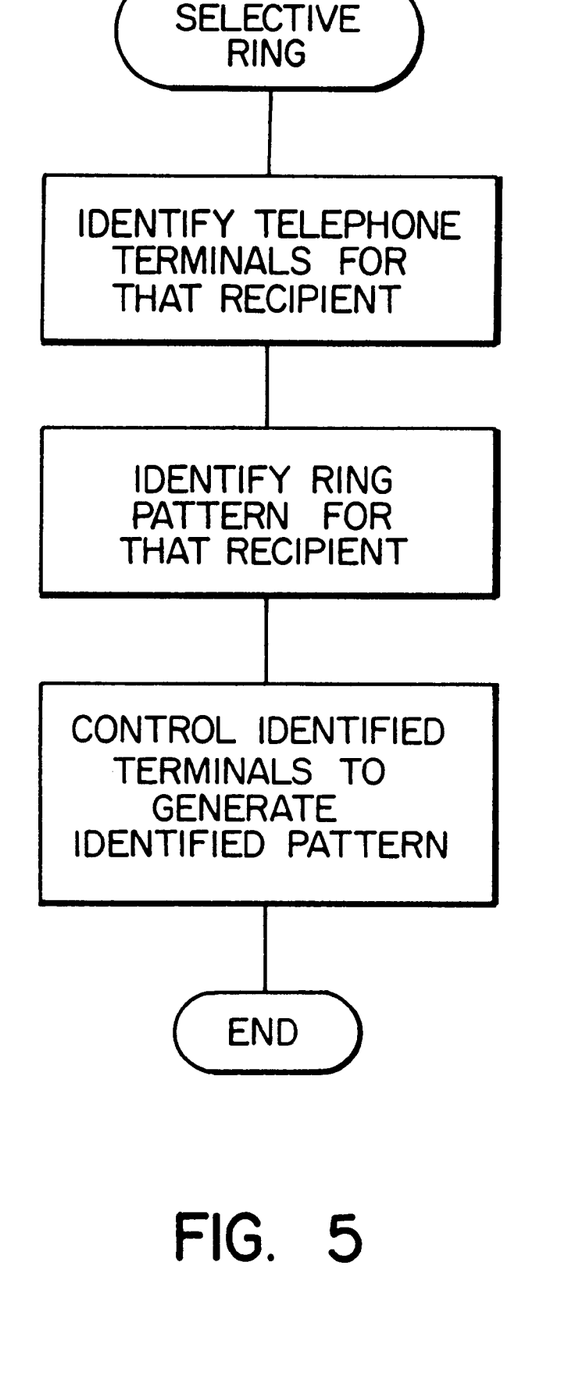
FIG. 5 is a flow chart depicting operation of the personal communications controller to effect selective ringing functionality.

The automatic attendant service implemented by the PCC 10 has determined who an incoming call is for. Selective ringing then determines how to ring or alert that intended recipient. FIG. 5 exemplifies a process for effecting selective ringing.

The alerting by the PCC 10 can be configured to be via distinctive ringing and/or via selective ones of the telephone terminals 16. The particular telephone terminal or multiple terminals 16 and the particular ringing cadence are indicated in the configuration data for each recipient and the appropriate selective ringing is based on the determined destination for the incoming call.

This service is implemented by the capability of the PCC 10 to answer a call and then, for example in relation to the PCC embodiment 31 in FIG. 3a, use the internal ringing generator 60 within the SCM 26 to re-ring individual extension telephone sets. The PCC 10 transmits over the inhouse telephone wiring an appropriate control signal in which the specific SCMs 26 that generate rings are identified together with the specific ring pattern. For the wireless embodiment of the PCC 74 in FIG. 3c, a similar control signal may be transmitted over a radio wave link, to activate ring generators of the specific handsets 24 in accordance with the specific ring pattern.

A typical application would be to configure the kitchen and family room telephones to always ring on all calls but with a distinctive ringing cadence for different recipients. Bedroom and office phones can be configured to only ring for the actual "occupants" of those rooms.

Toll Alert

Figure 6:
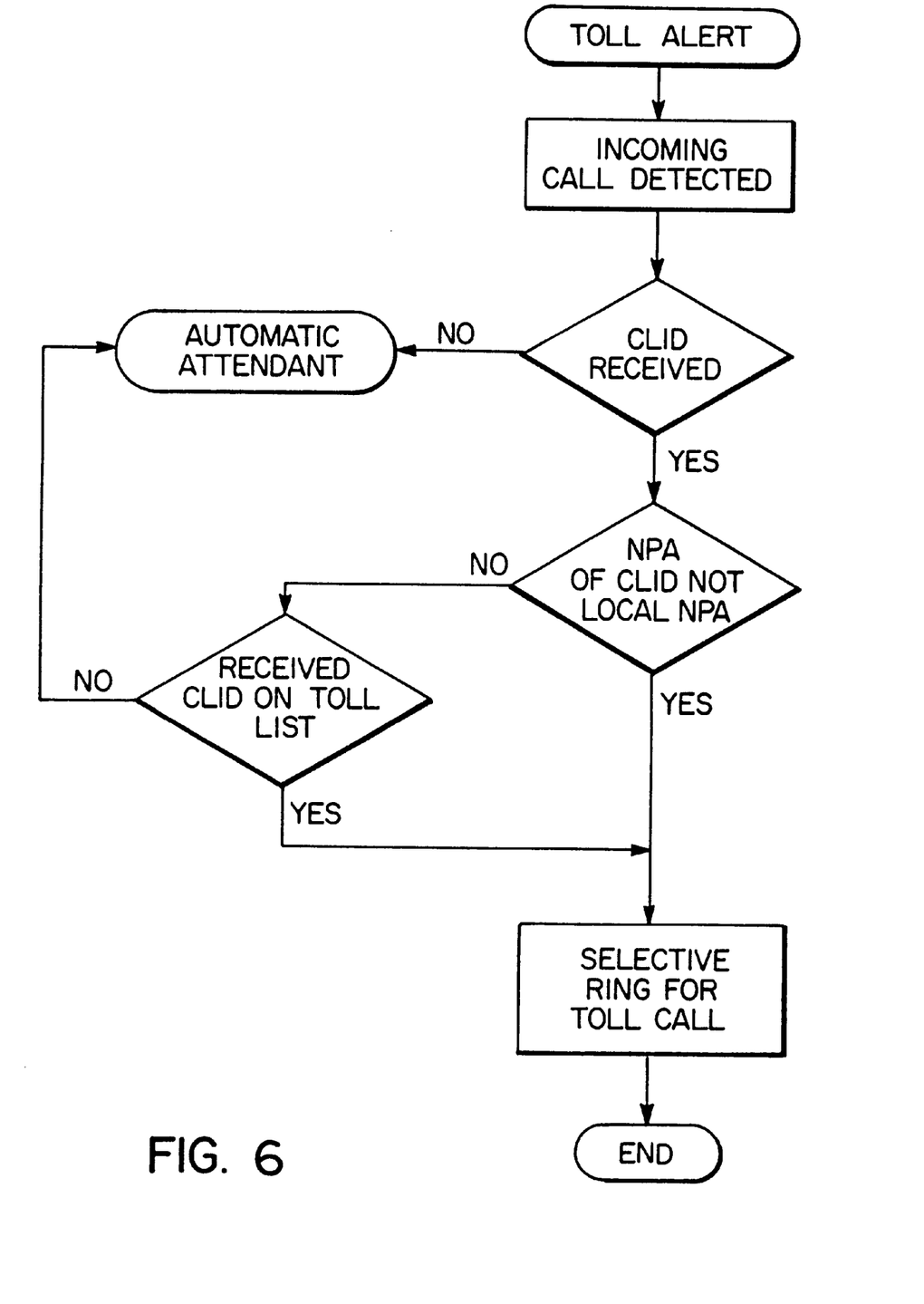
FIG. 6 is a flow chart depicting operation of the personal communications controller to effect toll alerting functionality.

FIG. 6 exemplifies a process for toll alerting effected by the PCC 10. Toll alerting is based on the CLID for an incoming call in conjunction with a user defined toll DN list. The PCC 10 compares the area code or numbering plan area (NPA) of a received CLID with the user's local NPA which forms part of the configuration data and recognizes the incoming call as being a toll call when the two NPAs do not match. Furthermore, an incoming call CLID whose NPA matches the local NPA may still be recognized as a toll call if the incoming DN matches an entry in the pre-defined toll DN list. Recognized toll calls may be identified as such by a distinctive ring cadence (e.g., two shorter rings) which is defined in the configuration data in association with the local NPA. In addition, at the user's discretion, these toll calls may be routed to a specific telephone terminal or terminals 16 which are specified in the configuration data.

Figure 7:
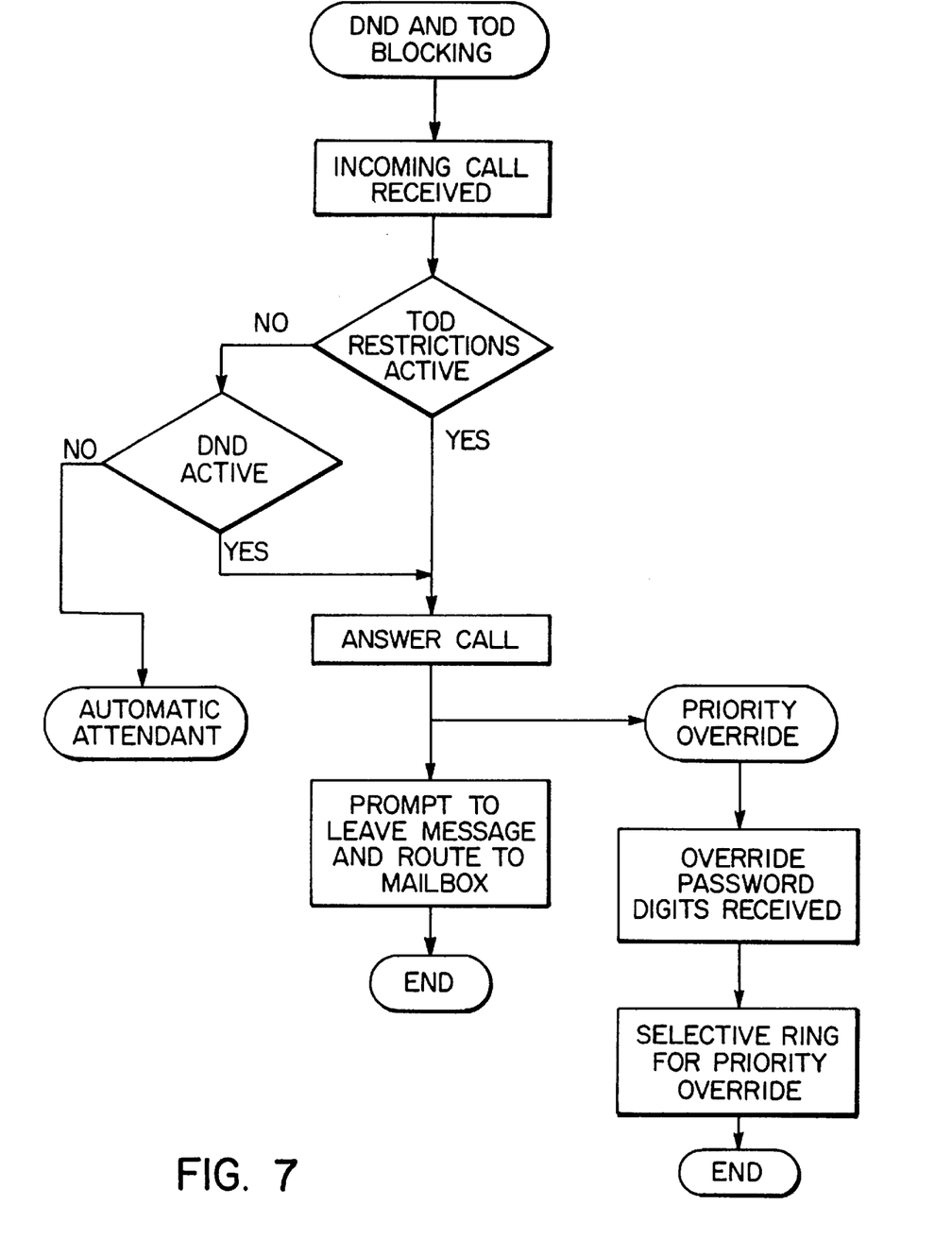
FIG. 7 is a flow chart depicting operation of the personal communications controller to effect do not disturb, time of day blocking and priority override functionality.

FIG. 7 exemplifies a process for effecting by the PCC 10 a do not disturb (DND), time of day (TOD) blocking, and priority override functions described in the following.

Do Not Disturb

The "do not disturb" (DND) feature is beneficial for when users desire a "quiet time", for instance so that they can simply relax, read a paper, or eat a meal without being disturbed by incoming calls. The DND feature may be activated on an as needed basis, either for a predetermined interval of time as specified in the configuration data or indefinitely, by depressing a key on the PCC 10 or any extension telephone terminal 16. When this feature is active, incoming calls are routed immediately to a mailbox where the caller is invited to record a message. Each recipient directory list may identify with one of the multiple mailboxes provided by the DTAD 24, with selection of the mailbox being dependent upon correlating the CLID of the incoming call to a particular recipient. Also, each call treatment option provided by the automatic attendant may be associated with a particular mailbox, to which the caller is routed when that option is selected an the DND feature is active.

Time of Day (TOD) Ringing and Blocking

At the user's discretion, calls will not be allowed by the PCC 10 to ring the telephone terminals 16 at specific intervals in the day, and instead the caller may be presented with a specific greeting. As an example, calls received after 10 p.m. could be routed to a greeting such as "The Smith family does not take calls after 10 p.m. Please call again tomorrow". Alternatively, the PCC 10 could invite the caller to leave a message in a general mailbox, or the mailbox of the intended recipient to which the incoming CLID corresponds or the mailbox associated with the selected call treatment option. Users may provide as part of the configuration data a time of day window (i.e., a start time and finish time) and at receipt of an incoming call, the PCC 10 retrieves current time from its internal TOD clock to determine whether that call should be blocked or enabled.

Priority Override

Priority override provides a means for selected callers to "break through" the call screening features effected by the PCC 10 and ring any or all of the telephone terminals 16 in the residence. A predetermined override password forms part of the configuration data and when a caller enters the password via the touch-tone (DTMF) keypad, the PCC 10 then rings desired terminals, with or without a distinctive ring. The desired one or more terminals may be specified in connection with the override password in the configuration data or, alternatively, all the terminals 16 may be rung.

Incoming Call Detail Recording

Details of incoming calls are recorded and stored in memory of the PCC 10. Subsequently, this information may be uploaded to the PC 20 where it can be used to build or amend personal contact lists, such as, Christmas card lists, business contacts, community & school service groups and the like.

Single Number Service

Figure 8:
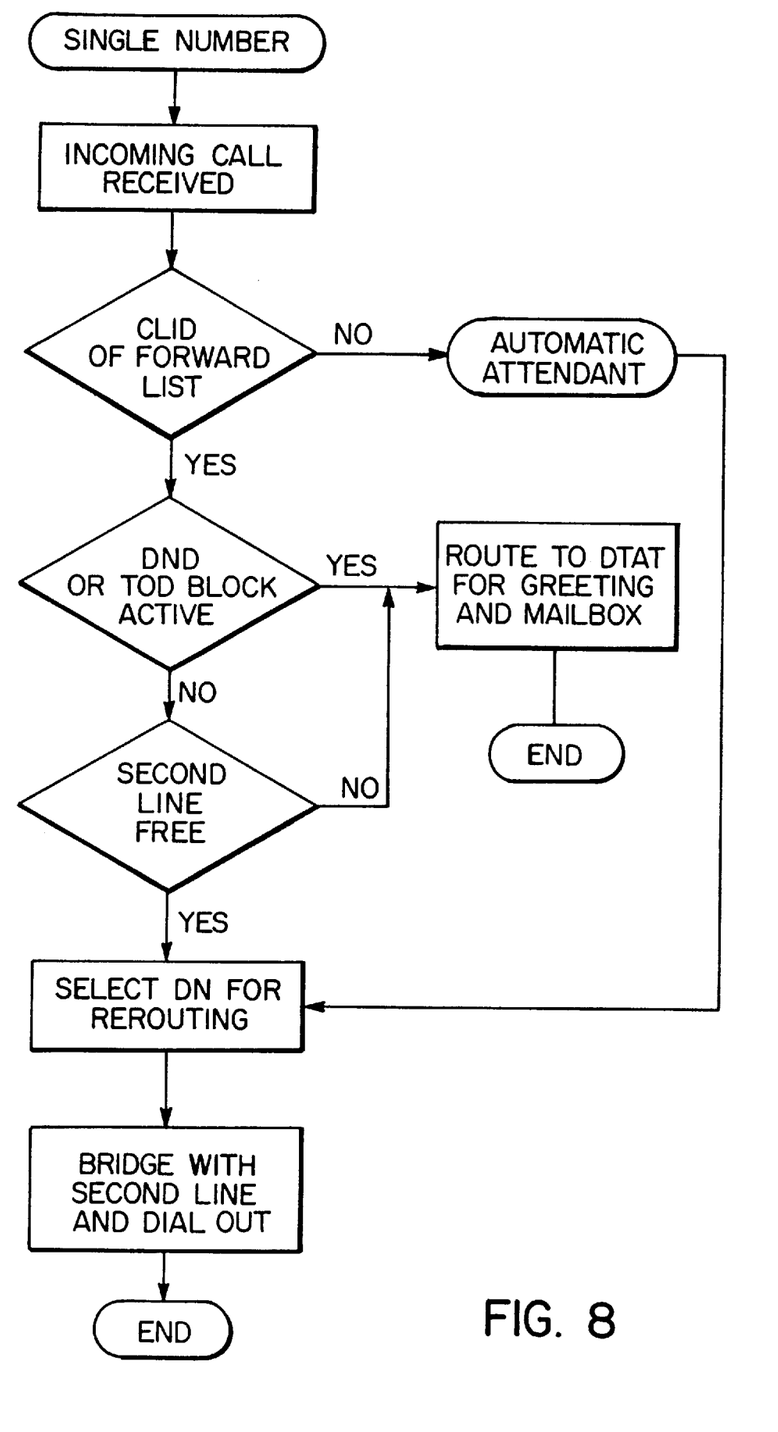
FIG. 8 is a flow chart depicting operation of the personal communications controller to effect single number service functionality.

FIG. 8 exemplifies a process for effecting single number service by the PCC. Incoming calls can be re-routed by the PCC 10 to another directory number, such as, that of a cellular service. The DN for rewriting may simply be a single predetermined number forming part of the configuration data or there may multiple rewriting DNs with selection of an appropriate one being based on any of time of day, incoming caller CLID information, priority override or by a menu selection from the auto attendant. This feature requires either two lines or ISDN service to the central office 14 of the telephone network.

Call Origination

Services and features under this functional area include selective blocking of outgoing calls, call detail recording and selective barge in, for which operation of the PCC 10 is described below.

Selective Outgoing Call Blocking

Figure 9:
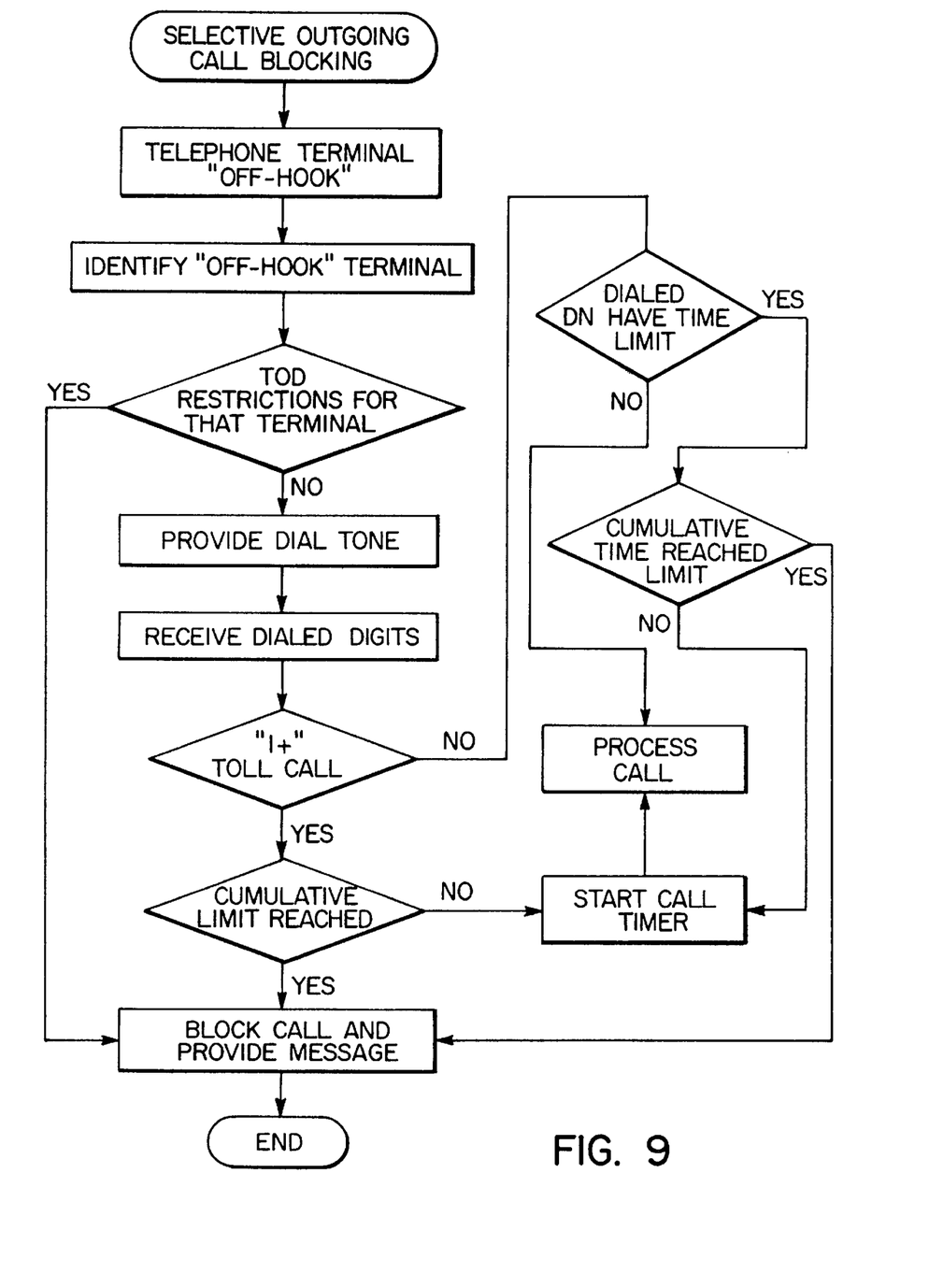
FIG. 9 is a flow chart depicting operation of the personal communications controller to effect selective outgoing call blocking functionality.

FIG. 9 exemplifies a process for effecting selective blocking of outgoing calls. The PCC 10 may use the combination of dialed DTMF digits and originating extension telephone terminal identification numbers received from the terminal at which an outgoing call is being originated, to determine whether or not to allow the outgoing call to proceed. For example, outgoing toll calls could be blocked when they originate from a terminal 16 located in child's bedroom. The configuration data contains specific directory numbers and directory strings with wild card characters, such as 900*, which are associated with terminal identifiers corresponding to telephone terminals 16 from which originating calls are to be blocked by the PCC 10.

Alternatively, all outgoing calls could be blocked from a particular terminal 16, for example, in the child's room between 11:00 PM and 7:00 AM. In this case, the time window for blocking the outgoing call would be specified together with the identification number of that terminal 16 in the configuration data.

A more extensive service is to limit a child to a predetermined number "XX" hours a month of outgoing toll calls. All subsequent toll calls would be blocked. This may be effected by providing in the configuration data a value for the maximum number of hours to be allowed together with an identifier of the telephone terminal the child should use when making the toll calls. The PCC 10 maintains a count of time for toll calls from that terminal and once the maximum is depleted, the PCC 10 inhibits further toll calls. As described above in connection with toll alerting for incoming calls, recognition of outgoing calls as toll calls may be done by comparing the NPA of the dialed DN to the local NPA (i.e., toll if different) or by comparing the dialed DN to a pre-defined list of toll numbers. Another service is for the PCC 10 to accumulate total calling time to a particular DN, for example, an online service; once a monthly limit is exceeded then all subsequent calls to the online service are blocked. The particular number and time limit are specified in the configuration data.

Call Detail Recording For Outgoing Calls

Details of outgoing calls are recorded and stored on the PCC 10 from which it subsequently may be uploaded to the PC 20. This information may be used, for example, to track activities and telecommunications expenses associated with personal work for non-profit organizations and community or school service groups. Such activity can be recorded for each member of the family and for each telephone terminal 16 in the residence.

Selective Barge In

The PCC 10 can selectively prevent other extensions from inadvertently "barging into" an existing call. It could be as simple as preventing all other extensions from entering any telephone call that originates in the office/study. For instance, the SCMs 26 of the embodiment for the PCC system in FIG. 3*a* could disconnect, under the command of the PCC 10, their respective telephone terminals from the inhouse telephony wiring.

Call Integrity and Administration

Examples of services and features provided in this functional area include data call protection, call timing alerts, and file and data transfer.

Data Call Protection

Figure 10:
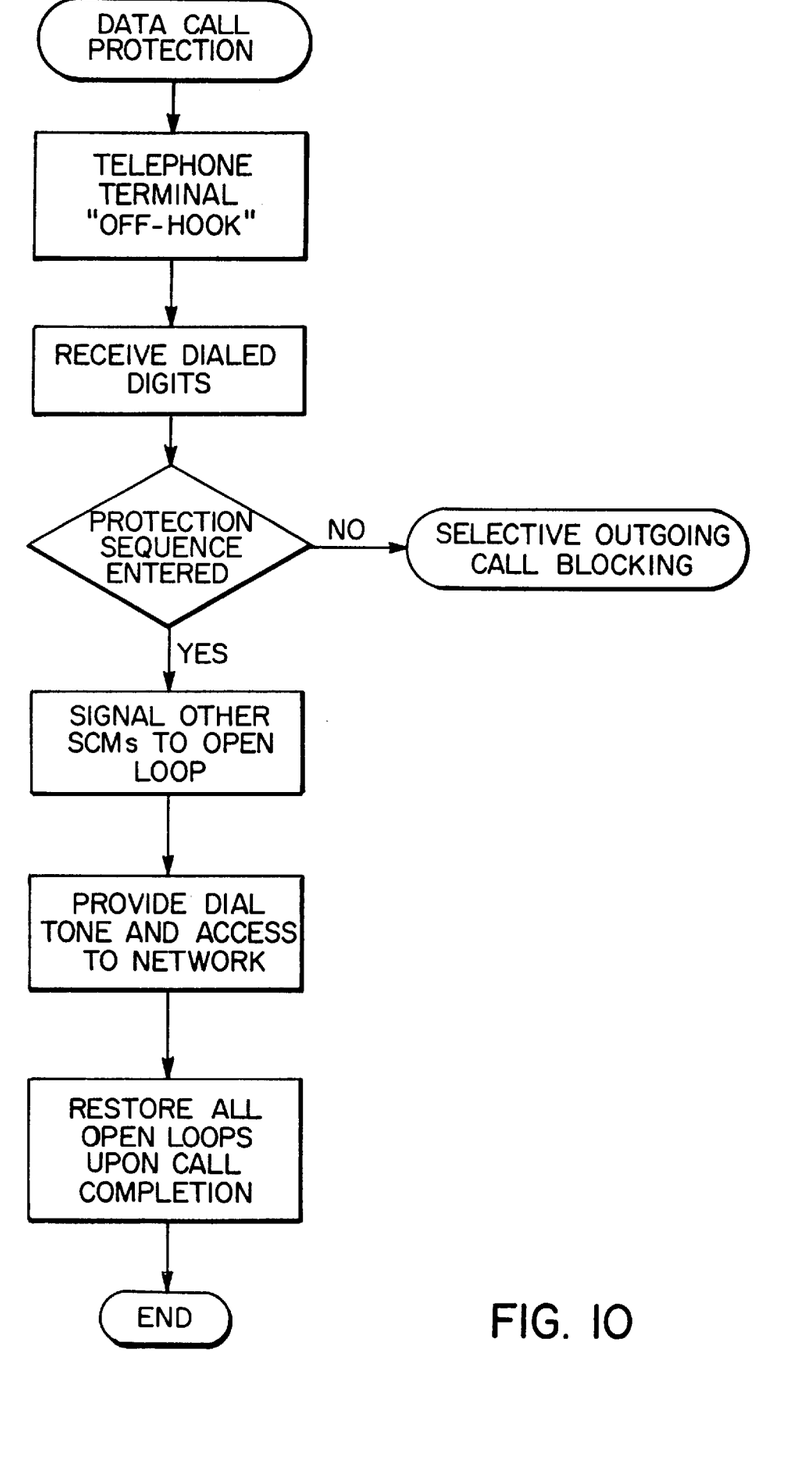
FIG. 10 is a flow chart depicting operation of the personal communications controller to effect data call protection functionality.

This feature prevents other extensions from entering a pre-existing FAX or data call, and potentially interrupting the modem tones. FIG. 10 exemplifies a process for effecting data call protection by the PCC 10.

For the embodiment 31 in FIG. 3*a*, when the PCC 10 detects a call from a SCM 26 connected to a FAX machine or modem then it knows a data call is in progress. Alternatively, when a user sets up a data call on his/her residential line, he or she may elect to disable network features such as Call Waiting, by dialing a standard code at the start of the call (i.e.: *67). When the PCC 10 detects such a signal, all (or selected) extensions in the home may be disabled. The PCC 10 controls the appropriate SCMs 26 to open an internal switch whereby its attached telephone terminal is disconnected from the inhouse telephony wiring, so the data call cannot be inadvertently knocked down by an extension going "off-hook".

Call Timing Alerts

Calls (either incoming or outgoing) are timed by the PCC 10 for purposes of call detail recording. The user can pre-record voice messages that will be played over the conversation at prescribed intervals. For instance, on outgoing toll calls, announcements such as "Ten minutes", "Twenty minutes" could be read out at the appropriate intervals.

File and Data transfer

Files and data may be transferred to and from the PCC 10 and the PC 20. Data such as speed call lists, caller lists and long distance call summaries, and configuration files such as Time of Day ringing is created or modified at either the PCC 10 or the PC 20. Such data can be loaded either to the PC 20 for storage and further manipulation or down to the PCC 10 for implementation. Transfer and synchronization activity is automatic, running at off-peak intervals, and interrupted immediately if an incoming or outgoing call is initiated.

Those skilled in the art will recognize that various modifications and changes could be made to the invention without departing from the spirit and scope thereof. It should therefore be understood that the claims are not to be considered as being limited to the precise embodiments of the personal communications controller system set forth above, in the absence of specific limitations directed to each embodiment.

We claim:

1. In a telecommunications functions management system for a telecommunications service subscriber having a plurality of telephone terminals communicatively coupled to a telecommunications network, a method for managing outgoing calls originating from any of the plurality of telephone terminals, comprising the steps of:

associating one or more telephone terminals of the plurality of telephone terminals with respective toll time limits;

measuring, for each one of the one or more telephone terminals associated with the respective toll time limits, cumulative time of all toll calls from that terminal;

identifying one terminal of the plurality of telephone terminals at which one outgoing call is being originated; and blocking, responsive to determining the one outgoing call corresponds to a toll call and the one terminal has a toll time limit associated therewith, the one outgoing call if the measured cumulative time for the one terminal effectively reaches the toll time limit.

2. A method as claimed in claim 1, comprising the steps of:

providing one or more predetermined timed call identifiers;

associating each predetermined timed call identifier with one or more telephone terminals of the plurality of telephone terminals and with a time limit;

measuring, for each of the one or more predetermined timed call identifiers when outgoing calls correlated thereto originate from any of the one or more telephone terminals associated therewith, cumulative time of the outgoing calls corresponding to that timed call identifier;

correlating a directory number of the one outgoing call to a particular timed call identifier of the one or more predetermined timed call identifiers; and blocking, responsive to the one terminal being associated with the particular timed call identifier and the measured cumulative time for the particular timed call identifier that effectively reaches the time limit associated therewith, the one outgoing call.

3. In a telecommunications functions management system for a telecommunications service subscriber having a plurality of telephone terminals communicatively coupled to a telecommunications network, a method for managing outgoing calls originating from any of the plurality of telephone terminals, comprising the steps of:

providing one or more predetermined timed call identifiers;

associating each predetermined timed call identifier with one or more telephone terminals of the plurality of telephone terminals and with a time limit;

measuring, for each of the one or more predetermined timed call identifiers when outgoing calls correlated thereto originate from any of the one or more telephone terminals associated therewith, cumulative time of all the outgoing calls corresponding to that timed call identifier;

correlating a directory number of one outgoing call to a particular timed call identifier of the one or more predetermined timed call identifiers; and blocking, responsive to the one terminal being associated with the particular timed call identifier and the measured cumulative time for the particular timed call identifier that effectively reaches the time limit associated therewith, the one outgoing call.

4. For a telecommunications service subscriber having a plurality of telephone terminals communicatively coupled to a telecommunications network, a system for managing outgoing calls originating from any of the plurality of telephone terminals, comprising:

means for enabling a subscriber to associate one or more telephone terminals of the plurality of telephone terminals with respective toll time limits;

means for measuring, for each of the one or more telephone terminals associated with the respective toll time limits, cumulative time of all toll calls from that terminal;

means for identifying one terminal of the plurality of telephone terminals at which one outgoing call is being originated; and means for blocking, responsive to determining the one outgoing call corresponds to a toll call and the one terminal has a toll time limit associated therewith, the one outgoing call if the measured cumulative time for the one terminal effectively reaches the toll time limit.

5. A system as claimed in claim 4, comprising:

means for providing one or more predetermined timed call identifiers;

means for enabling a subsriber to associate each predetermined timed call identifier with one or more telephone terminals of the plurality of telephone terminals and with a time limit;

means for measuring, for each of the one or more predetermined timed call identifiers when outgoing calls correlated thereto originate from any of the one or more telephone terminals associated therewith, cumulative time of the outgoing calls corresponding to that timed call identifier;

means for correlating a directory number of the one outgoing call to a particular timed call identifier of the one or more predetermined timed call identifiers; and means for blocking, responsive to the one terminal being associated with the particular timed call identifier and the measured cumulative time for the particular timed call identifier that effectively reaches the time limit associated therewith, the one outgoing call.

6. For a telecommunications service subscriber having a plurality of telephone terminals communicatively coupled to a telecommunications network, a system for managing outgoing calls originating from any of the plurality of telephone terminals, comprising:

means for providing one or more predetermined timed call identifiers;

means for enabling a subscriber to associate each predetermined time call identifier with one or more telephone terminals of the plurality of telephone terminals and with a time limit;

means for measuring, for each of the one or more predetermined timed call identifiers when outgoing calls correlated thereto originate from any of the one or more telephone terminals associated therewith, cumulative time of all the outgoing calls corresponding to that timed call identifier;

means for correlating a directory number of one outgoing call to a particular timed call identifier of the one or more predetermined timed call identifiers; and means for blocking, responsive to the one terminal being associated with the particular timed call identifier and the measured cumulative time for the particular timed call identifier that effectively reaches the time limit associated therewith, the one outgoing call.

* * * * *